United States Patent [19]
Heinzman et al.

[11] Patent Number: 5,669,634
[45] Date of Patent: Sep. 23, 1997

[54] ENERGY ABSORBER FOR MOTOR VEHICLE STEERING COLUMN

[75] Inventors: Marc William Heinzman, Frankenmuth; Michael Patrick Anspaugh, Bay City; Richard Kremer Riefe; David Michael Byers, both of Saginaw, all of Mich.

[73] Assignee: General Motors Corporation, Detroit, Mich.

[21] Appl. No.: 645,320

[22] Filed: May 13, 1996

[51] Int. Cl.⁶ .................................................. B62D 1/19
[52] U.S. Cl. ................................. 280/777; 74/493
[58] Field of Search ....................... 280/777, 775; 74/492, 493

[56] References Cited

U.S. PATENT DOCUMENTS

| | | | |
|---|---|---|---|
| 4,117,741 | 10/1978 | Yazane et al. | 74/492 |
| 4,838,576 | 6/1989 | Hamasaki et al. | 280/777 |
| 4,989,898 | 2/1991 | Yamaguchi et al. | 280/777 |
| 5,052,716 | 10/1991 | Matsumoto | 280/777 |
| 5,286,056 | 2/1994 | Speich | 280/777 |
| 5,562,307 | 10/1996 | Connor | 280/777 |
| 5,605,352 | 2/1997 | Riefe et al. | 280/777 |
| 5,609,364 | 3/1997 | Fouquet et al. | 280/777 |

FOREIGN PATENT DOCUMENTS

| | | | |
|---|---|---|---|
| 405949 | 1/1991 | European Pat. Off. | 280/777 |
| 474400 | 3/1992 | European Pat. Off. | 280/777 |

*Primary Examiner*—Paul N. Dickson
*Attorney, Agent, or Firm*—Saul Schwartz

[57] ABSTRACT

An energy absorber for a motor vehicle steering column including a yoke pivotable about a lateral centerline of a body of the motor vehicle and an energy absorbing structure responsive to linear translation of a mast jacket of the steering column relative to the yoke in the direction of a longitudinal centerline of the mast jacket. The mast jacket extends through a bore in the yoke and is prevented by the bore from tipping relative to the yoke. The energy absorbing structure includes a convex anvil on the mast jacket and a J-shaped flat metal strap seated on the convex anvil with a short leg rigidly attached to the yoke and a long leg juxtaposed a wall of the mast jacket. An impact on the steering column initiates linear translation of the mast jacket in the direction of its longitudinal centerline relative to the yoke during which the convex anvil translates linearly relative to the stationary metal strap so that the metal strap is pulled over the convex anvil and plastically deformed to convert into work a fraction of the kinetic energy of the impact.

4 Claims, 4 Drawing Sheets

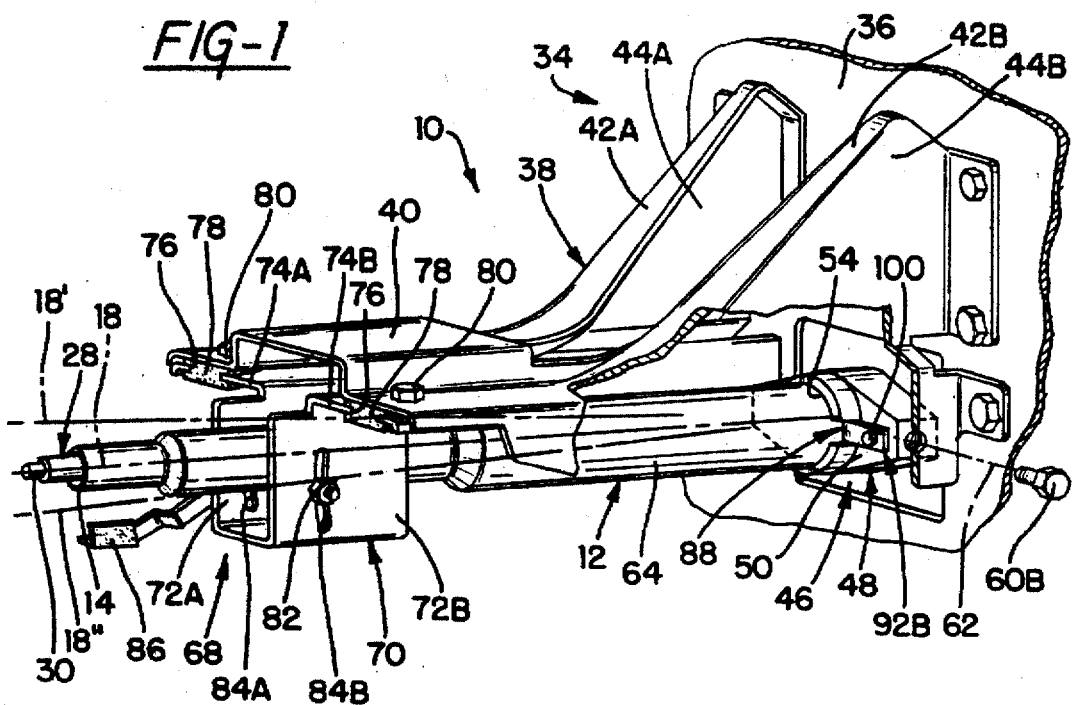
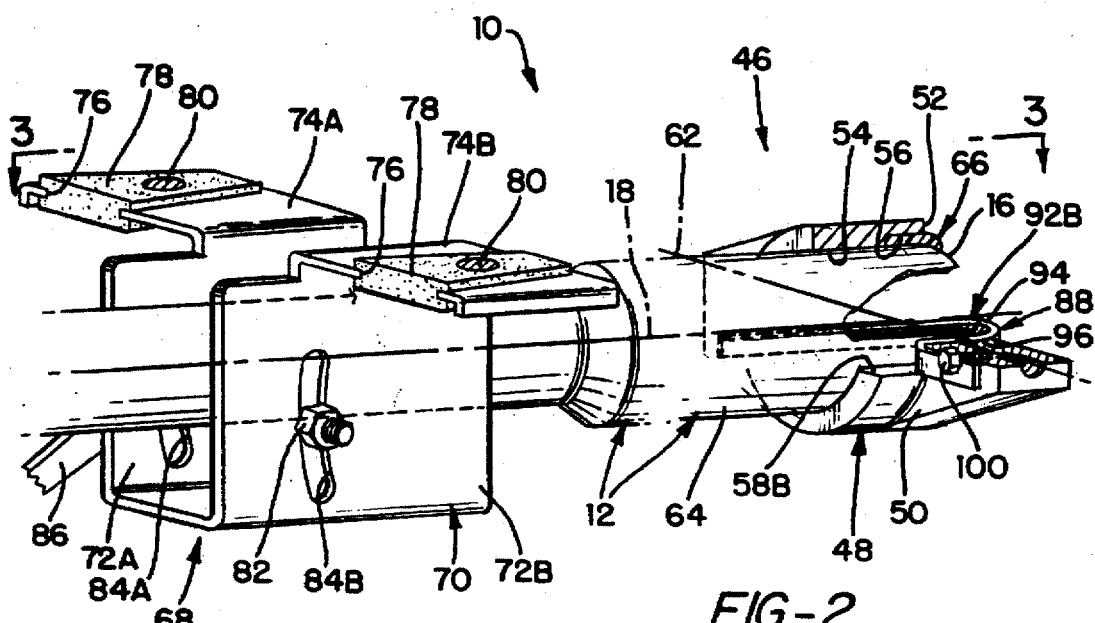

ENERGY ABSORBER FOR MOTOR VEHICLE STEERING COLUMN

FIELD OF THE INVENTION

This invention relates to energy-absorbing steering columns for motor vehicles.

BACKGROUND OF THE INVENTION

A known energy absorber of simple construction for a motor vehicle steering column consists of an anvil on the steering column near the upper end thereof and a metal strap bent around the anvil and attached at one end to a body structure of the motor vehicle. During impact initiated linear translation of the steering column through an energy-absorbing collapse stroke, the metal strap is plastically deformed as the anvil is pulled along the length of the strap. Plastic deformation of the strap converts into work a fraction of the kinetic energy of the impact. The placement of the energy absorber near the upper end of the steering column, however, consumes space in an already congested environment. Further, optimum energy-absorbing performance requires that the metal strap be parallel to the direction of linear translation of the steering column before and during the collapse stroke. It is difficult to maintain such parallelism where the steering column is "raked" or "rake adjustable", i.e., pivotable up and down about a centerline at the bottom of the steering column for adjustment of the vertical position of a steering wheel. It is, likewise, difficult to maintain such parallelism during the collapse stroke.

SUMMARY OF THE INVENTION

This invention is a new and improved energy absorber for a motor vehicle steering column including a yoke pivotable about a lateral centerline of a body of the motor vehicle and an energy absorbing means responsive to linear translation of a mast jacket of the steering column relative to the yoke in the direction of a longitudinal centerline of the mast jacket. The mast jacket extends through a bore in the yoke and is prevented by the bore from tipping relative to the yoke before and during linear translation relative to the yoke. The energy absorbing means includes a convex anvil on the mast jacket and a J-shaped flat metal strap seated on the convex anvil with a short leg rigidly attached to the yoke and a long leg juxtaposed a wall of the mast jacket and confined in a guide means which maintains the long leg of the metal strap parallel to the longitudinal centerline of the mast jacket. An impact on the steering column initiates linear translation of the mast jacket in the direction of its longitudinal centerline relative to the yoke during which linear translation the convex anvil translates linearly with the mast jacket relative to the stationary metal strap. Relative to the mast jacket, the metal strap is concurrently pulled over the convex anvil to plastically deform the metal strap and convert into work a fraction of the kinetic energy of the impact.

BRIEF DESCRIPTION OF THE DRAWINGS

FIG. 1 is a fragmentary, partially broken-away, perspective view of a motor vehicle steering column having an energy absorber according to this invention;

FIG. 2 is an enlarged, partially broken-away view of a portion of FIG. 1;

DESCRIPTION OF A PREFERRED EMBODIMENT

Figure 3:
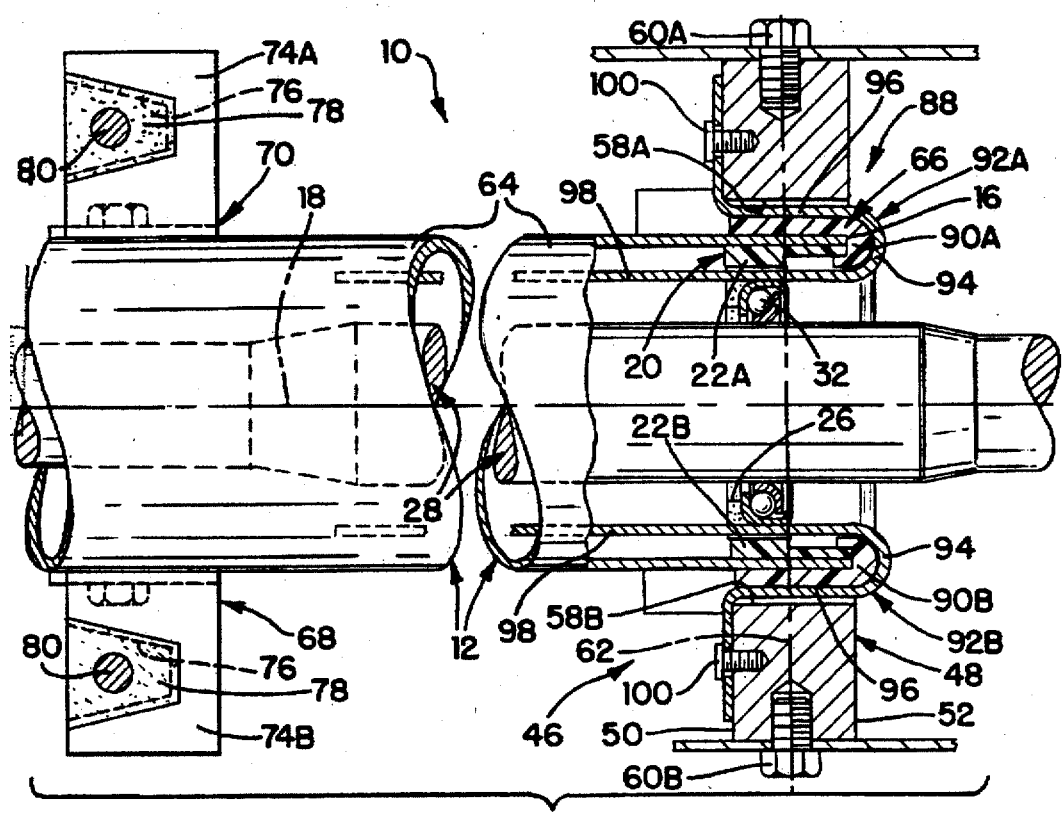
FIG. 3 is a sectional view taken generally along the plane indicated by lines 3—3 in FIG. 2.
Figure 4:
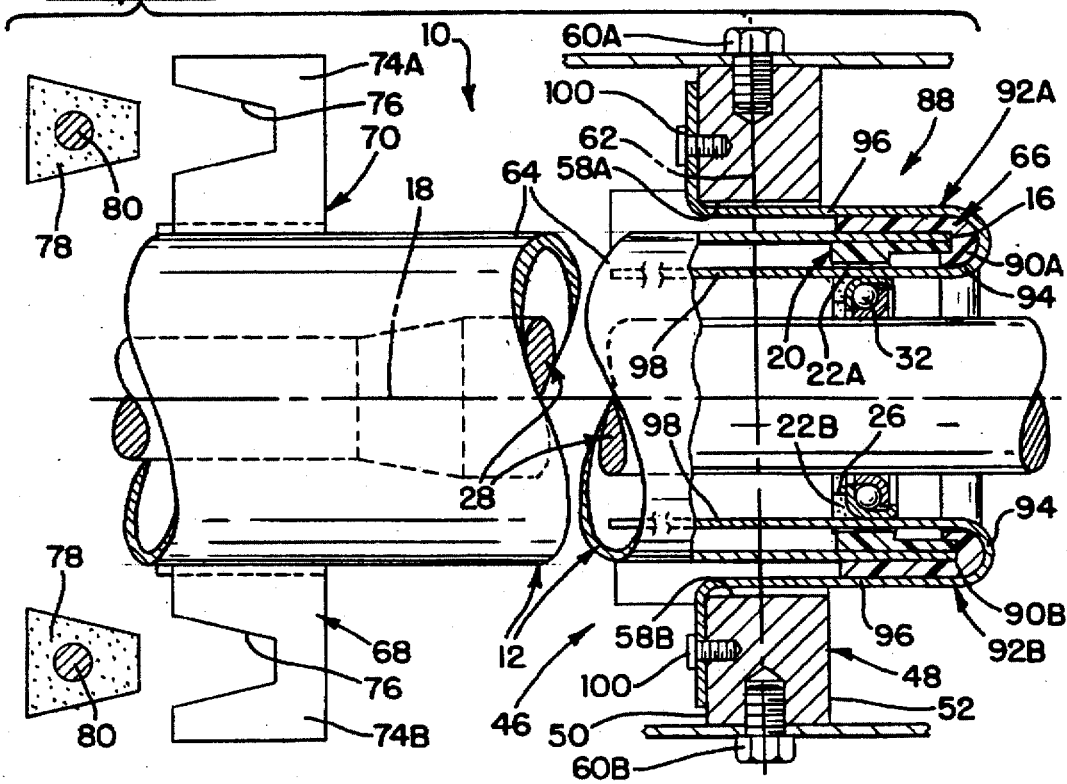
FIG. 4 is similar to FIG. 3 showing elements of the energy absorber according to this invention in different relative positions.
Figure 5:
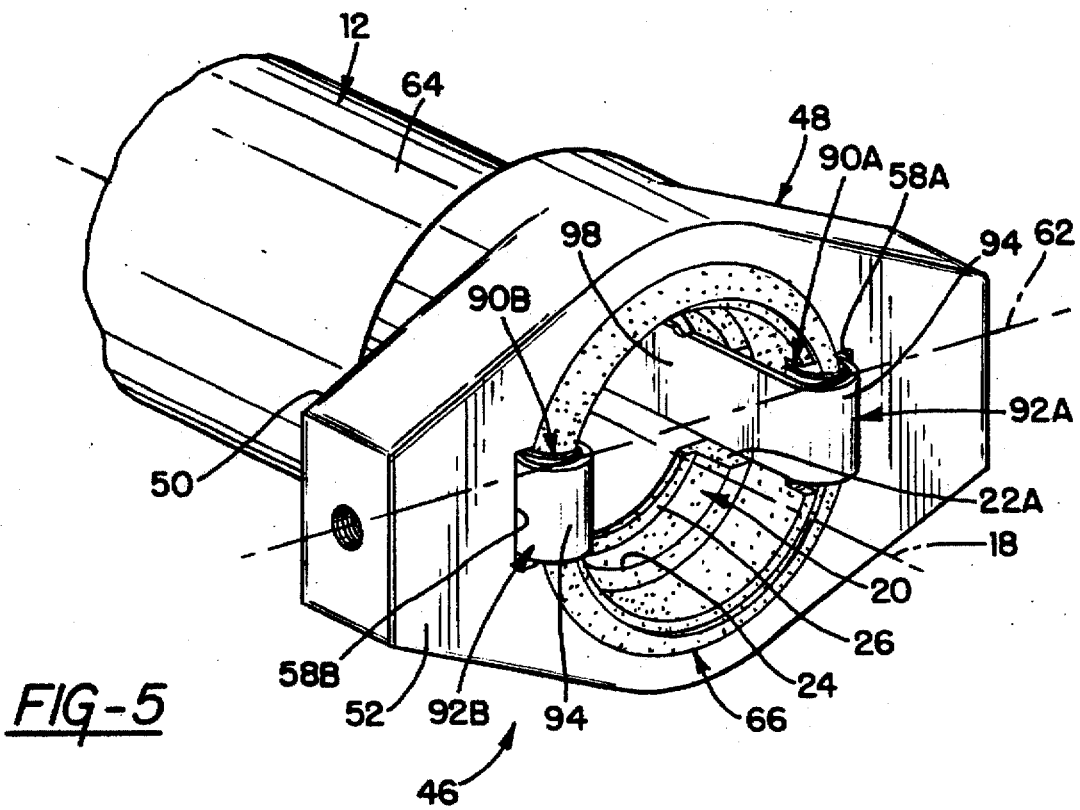
FIG. 5 is a perspective view of the energy absorber according to this invention.

A motor vehicle steering column 10 includes a tubular mast jacket 12 having an upper end 14, FIG. 1, and a lower end 16, FIGS. 2–4. A longitudinal centerline 18 of the mast jacket 12 coincides with the longitudinal centerline of the steering column. A plastic ring 20 is rigidly fitted inside the mast jacket adjacent the lower end 16 thereof and includes a pair of diametrically opposite slots 22A, 22B parallel to the longitudinal centerline 18 of the mast jacket 12 and a cylindrical inner wall 24, FIG. 5, which terminates at an internal annular shoulder 26 facing the lower end of the mast jacket.

The steering column 10 further includes a steering shaft 28 having an upper end 30 projecting beyond the upper end 14 of the mast jacket 12 and a lower end, not shown, projecting beyond the lower end 16 of the mast jacket. A ball bearing 32 is interference fitted in the cylindrical inner wall 24 of the plastic ring 20 against the annular shoulder 26 and cooperates with additional bearings, not shown, in supporting the steering shaft 28 on the mast jacket 12 for rotation about the longitudinal centerline 18. Thrust bearings, not shown, transfer thrust in the direction of the longitudinal centerline 18 from the steering shaft to the mast jacket so that forces attributable to an impact on a steering wheel, not shown, on the upper end 30 of the steering shaft are transferred from the steering shaft to the mast jacket.

A fragmentarily illustrated body structure 34, FIG. 1, of the motor vehicle includes a vertical panel 36 at the forward extremity of a passenger compartment of the motor vehicle and a bracket 38 bolted to the vertical panel. The bracket 38 includes a horizontal panel 40 and a pair of integral supports 42A, 42B. The horizontal panel 40 is flanked on opposite sides by a pair of depending vertical sides 44A, 44B of the bracket 38 integral with the horizontal panel and with the supports 42A, 42B, respectively.

An energy absorber 46 according to this invention includes a yoke 48 having a first side 50 facing the upper end of the mast jacket, an opposite second side 52, a bore 54 between the first and second sides, a counterbore 56 in the second side 52 around the bore 54, and a pair of diametrically opposite slots 58A, 58B facing the bore 50 and extending the length thereof. A pair of bolts 60A, 60B threaded into holes in opposite ends of the yoke through a corresponding pair of apertures in the vertical sides 44A, 44B, respectively, of the bracket 38 define a pair of trunnions supporting the yoke 48 on the body structure 34 for pivotal movement about a lateral centerline 62 of the body structure.

An outer cylindrical wall 64 of the mast jacket 12 is closely received in the bore 54 in the yoke with the longitudinal centerline 18 of the mast jacket intersecting the lateral centerline 62. The slots 22A, 22B in the plastic ring 20 are disposed in the plane defined by the intersecting centerlines 18, 62. The slots 58A, 58B in the yoke 48 are similarly disposed in the plane defined by the intersecting centerlines 18, 62 radially outboard of the slots 22A, 22B. An annular collar 66 is rigidly attached to the mast jacket 12 over the lower end 16 thereof and is interference fitted in the counterbore 56.

The bore 54 and the counterbore 56 cooperate with the outer cylindrical wall 64 and the collar 66 in uniting the yoke 48 and the mast jacket 12 for rake adjustment of the steering column 10, i.e., up and down pivotal movement about the lateral centerline 62 at the bottom of the steering column, between upper and lower limit positions represented by positions 18' and 18" of the centerline 18 of the steering column, FIG. 1. The bore 54 also defines a slide bearing for linear translation of the mast jacket relative to the yoke in the direction of the longitudinal centerline 18 and prevents tipping of the mast jacket 12 relative to the yoke 48 before and during relative linear translation so that the slots 22A, 22B and 58A, 58B remain in the plane of the intersecting centerlines 18, 62 regardless of the angular position of the steering column 10 relative to the vehicle body structure.

A generic clamp 68, FIGS. 1–2, is disposed between the bracket 38 and the mast jacket 12 and includes a box-shaped bracket 70 having a pair of vertical sides 72A, 72B on opposite sides of the mast jacket and a pair of horizontal flanges 74A, 74B extending outward from the vertical sides 72A, 72B, respectively. Each of the flanges 74A, 74B has a notch 76, FIG. 4, open toward the upper end 14 of the mast jacket in which is received a capsule 78. The capsules are retained in the notches 76 by plastic shear pins, not shown, and have openings through which a pair of hanger bolts 80 extend. A nut, not shown, on each hanger bolt 80 clamps the corresponding capsule 78 to the horizontal panel 40 of the bracket 38.

The clamp 68 further includes a cross bolt 82 on the mast jacket 12 projecting through a pair of arc-shaped slots 84A, 84B in the vertical sides 72A, 72B centered about the lateral centerline 62 and a lever 86 which rotates the cross bolt. When the cross bolt 82 is loose between the vertical sides 72A, 72B, the mast jacket 12 is rake adjustable. When the cross bolt 82 is tight between the vertical sides 72A, 72B, the mast jacket 12 is rigidly clamped to the box-shaped bracket 70.

An energy absorbing means 88 of the energy absorber 46 includes a pair of convex anvils 90A, 90B on the collar 66 molded integrally therewith of hard plastic. The convex anvils 90A, 90B are diametrically opposite each other in the plane defined by the intersecting centerlines 18, 62 and are, therefore, aligned with the slots 22A, 22B in the plastic ring 20 and the slots 58A, 58B in the yoke 48. The convex surface of each of the convex anvils radially overlaps the wall of the mast jacket 12.

The energy absorbing means 88 further includes a pair of flat metal straps 92A, 92B each plastically deformed into generally the shape of a "J". Each flat metal strap includes a concave web 94 seated against a corresponding one of the convex anvils 90A, 90B, a short leg 96 parallel to the longitudinal centerline 18 in a corresponding one of the slots 58A, 58B, the yoke 48, and a long leg 98 inside of the mast jacket in a corresponding one of the slots 22A, 22B in the plastic ring 20 outboard of the bearing 32 and parallel to the longitudinal centerline 18. An end of the short leg 96 of each flat metal strap 92A, 92B is bent back against the first side 50 of the yoke and rigidly attached to the yoke by a fastener 100. The slots 22A, 22B, the outside diameter of the bearing 32, and the steering shaft 28 define guide means which maintain substantial parallelism between the long leg 98 of each metal strap 92A, 92B and the longitudinal centerline 18.

An energy-absorbing collapse stroke of the steering column 10 commences with an impact toward the vertical panel 36 on the steering wheel on the upper end 30 of the steering shaft 28. Force attributable to the impact is transferred from the steering shaft 28 to the mast jacket 12 through the aforesaid thrust bearings and fractures the shear pins between the flanges 74A, 74B and the capsules 78 and releases the annular collar 66 from the counterbore 56. With the short legs 96 of the metal straps restrained by the fasteners 100, linear translation of the mast jacket 12 in the direction of its longitudinal centerline 18 relative to the yoke 48 causes relative sliding of the straps 92A, 92B across the convex anvils 90A, 90B with corresponding plastic deformation of the straps as each is bent through about 180°.

Plastic deformation of the straps 92A, 92B converts into work a fraction of the kinetic energy of the impact on the steering wheel. Importantly, because the bore 54 and the outside cylindrical wall 64 of the mast jacket 12 cooperate to maintain the angular relationship between the yoke 48 and the mast jacket 12 throughout the energy-absorbing collapse stroke, the metal straps 92A, 92B remain parallel to the longitudinal centerline 18 throughout the collapse stroke regardless of the angular position of the mast jacket 12 relative to the body structure of the motor vehicle for optimum energy absorbing performance. In addition, because the long legs 98 are concealed within the mast jacket 12 until the occurrence of an energy-absorbing collapse stroke of the steering column, they are shielded against accidental damage during transport and installation of the steering column 10.

Figure 6:
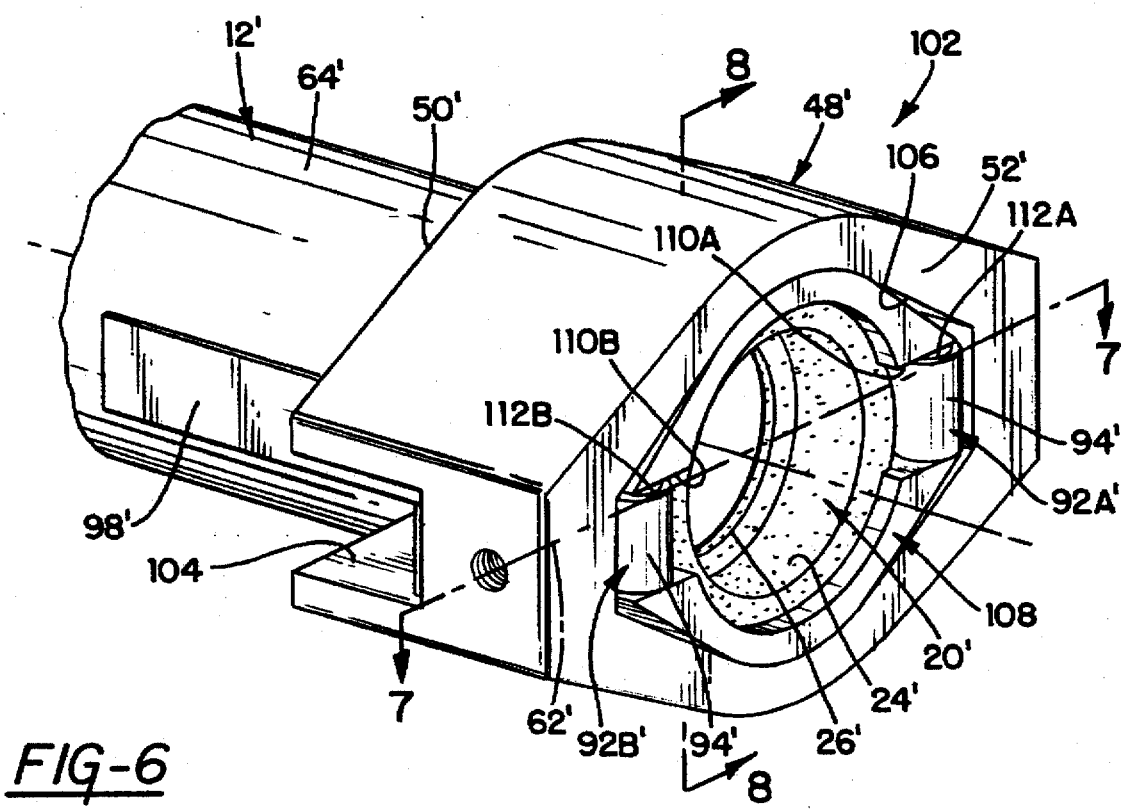
FIG. 6 is a perspective view of the a modified energy absorber according to this invention.
Figure 7:
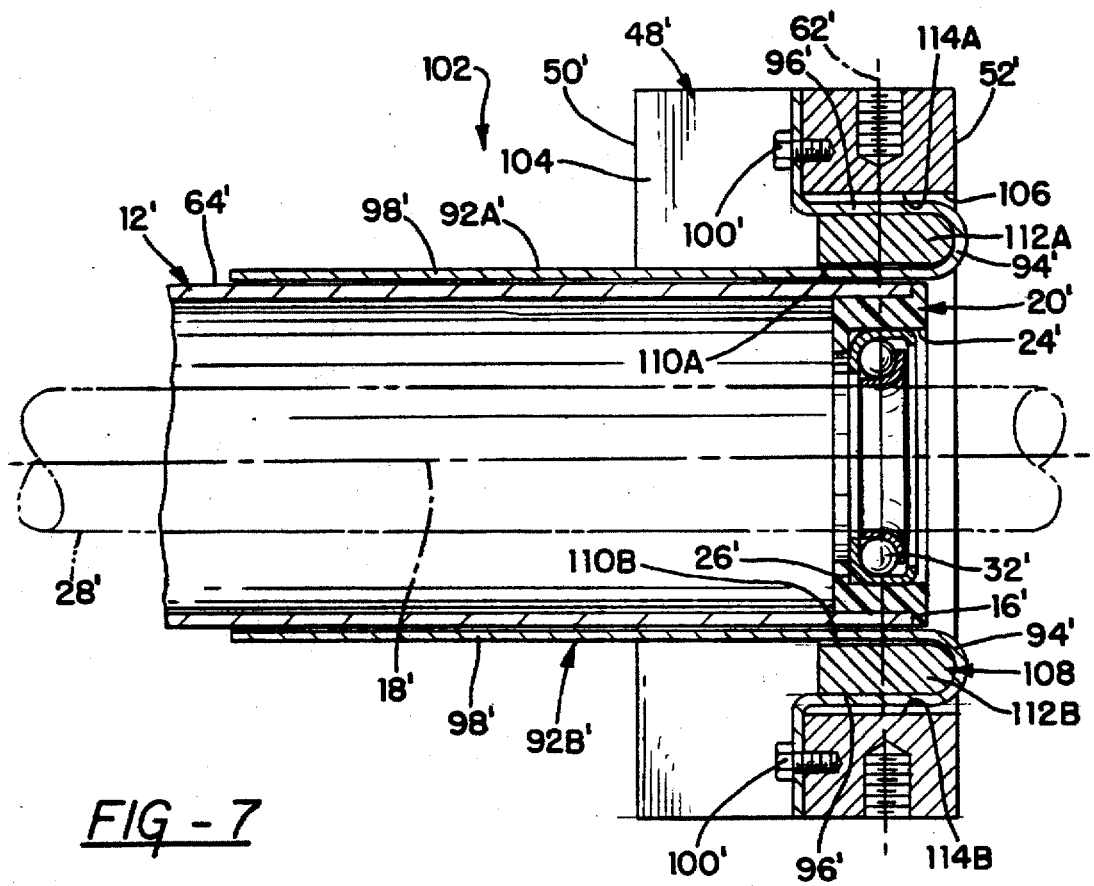
FIG. 7 is a sectional view taken generally along the plane indicated by lines 7—7 in FIG. 6.
Figure 8:
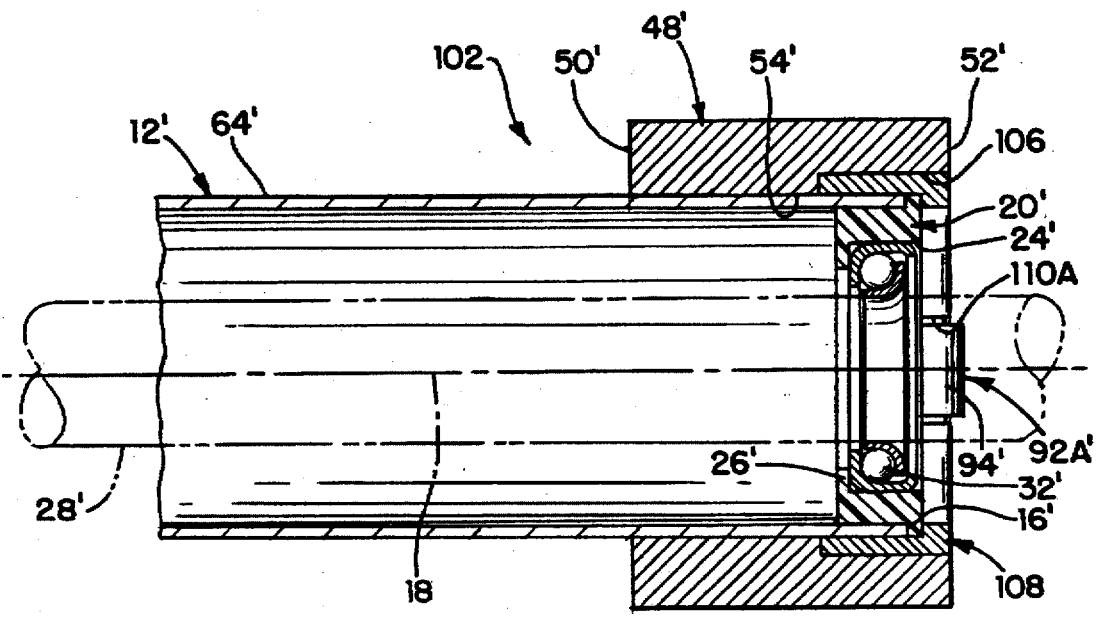
FIG. 8 is a sectional view taken generally along the plane indicated by lines 8—8 in FIG. 6.

A modified energy absorber 102 according to this invention is illustrated in FIGS. 6–8. Features of the modified energy absorber 102 corresponding to features of the energy absorber 46 are identified by primed reference characters. The modified energy absorber 102 includes a yoke 48' supported on a motor vehicle body structure, not shown, for pivotal movement about a lateral centerline 62'. The yoke has a first side 50', an opposite second side 52', and a lateral slot 104 in the first side across the yoke. A cylindrical bore 54' in the yoke 48' intersects the lateral slot 104 and an elongated cavity 106 in the second side 52' of the yoke.

An outer cylindrical wall 64' of the mast jacket 12' is closely received in the bore 54' in the yoke with a longitudinal centerline 18' of the mast jacket intersecting the lateral centerline 62'. The bore 54' cooperates with the outer cylindrical wall 64' in uniting the yoke 48' and the mast jacket 12' for rake adjustment of the steering column, i.e., up and down pivotal movement about the lateral centerline 62' at the bottom of the steering column. The bore 54' also defines a slide bearing for linear translation of the mast jacket relative to the yoke in the direction of its longitudinal centerline 18' and prevents tipping of the mast jacket relative to the yoke before and during relative linear translation of the mast jacket.

A plastic ring 20' is rigidly fitted inside the mast jacket 12' adjacent a lower end 16' thereof and includes a cylindrical inner wall 24' which terminates at an internal annular shoulder 26' facing the lower end of the mast jacket. A ball bearing 32' is interference fitted in the inner cylindrical wall 24' of the plastic ring 20' against the annular shoulder 26' and cooperates with additional bearings, not shown, in supporting a steering shaft 28' on the mast jacket 12' for rotation about the longitudinal centerline 18'. Thrust bearings, not shown, transfer thrust in the direction of the longitudinal centerline 18' from the steering shaft 28' to the mast jacket 12' so that forces attributable to an impact on a steering wheel on the steering shaft are transferred to the mast jacket 12'.

A collar 108 shaped to nest in the cavity 106 in the yoke is rigidly attached to the lower end 16' of the mast jacket 12'.

A pair of diametrically opposite passages 110A, 110B in the collar 108 closely adjacent the outer cylindrical wall 64' of the mast jacket 12' are disposed in the plane defined by the intersecting centerlines 18', 62'. A pair of convex anvils 112A, 112B are formed on the collar 108 radially outboard of the passages 110A, 110B and in the plane defined by the intersecting centerlines 18', 62'. Spaces between the ends of the collar 108 and the cavity 106 define a pair of passages 114A, 114B, FIG. 7, in the yoke parallel to the longitudinal centerline 18' radially outboard of the convex anvils 112A, 112B and also in the plane defined by the intersecting centerlines 18', 62'.

The modified energy absorber 102 further includes a pair of flat metal straps 92A', 92B' each plastically deformed into generally the shape of a "J". Each flat metal strap includes a concave web 94' seated against a corresponding one of the convex anvils 112A, 112B, a short leg 96' parallel to the longitudinal centerline 18' in a corresponding one of the passages 114A, 114B in the yoke, and a long leg 98' juxtaposed the outside cylindrical wall 64' of the mast jacket parallel to the longitudinal centerline 18' in a corresponding one of the passages 110A, 110B in the collar 108. An end of the short leg 96' of each flat metal strap 92A', 92B' is bent back against and rigidly attached to the yoke 48' by a fastener 100'. The passages 110A, 110B and the outside cylindrical wall 64' of the mast jacket define guide means which maintain substantial parallelism between the long leg 98' of each metal strap 92A', 92B' and the longitudinal centerline 18'.

Linear translation of the mast jacket 12' in the direction of the longitudinal centerline 18' relative to the yoke 48' causes relative sliding of the straps 92A', 92B' across the convex anvils 112A, 112B with corresponding plastic deformation of the straps as each is bent through about 180°. Concurrently, the aforesaid guide means maintain parallelism between the long legs 98' and the longitudinal centerline 18' of the steering column for optimum energy absorbing performance.

What is claimed is:

1. An energy absorber and a motor vehicle steering column having a mast jacket with a longitudinal centerline coincident with a longitudinal centerline of said steering column, characterized in that said energy absorber comprises:

a yoke mounted on a body structure of said motor vehicle for pivotal movement about a lateral centerline of said body structure, a bore in said yoke closely receiving an outer cylindrical wall of said mast jacket and cooperating therewith in supporting said mast jacket on said yoke with said longitudinal centerline of said mast jacket intersecting said lateral centerline for linear translation in the direction of said longitudinal centerline of said mast jacket and for pivotal movement as a unit with said yoke about said lateral centerline and in preventing tipping of said mast jacket relative to said yoke before and during linear translation of said mast jacket relative to said yoke, a convex anvil means on said mast jacket, a J-shaped flat metal strap having a concave web bearing against said convex anvil means and a first leg rigidly attached to said yoke and a second leg juxtaposed a wall of said mast jacket parallel to said longitudinal centerline of said mast jacket, linear translation of said mast jacket relative to said yoke in the direction of said longitudinal centerline of said mast jacket in response to an impact on said steering column being operative to effect relative sliding of said flat metal strap across said convex anvil means to plastically deform said metal strap and convert into work a fraction of the kinetic energy of said impact on said steering column, and guide means operative to maintain substantial parallelism between said second leg of said metal strap and said longitudinal centerline of said mast jacket during linear translation of said mast jacket relative to said yoke.

2. The energy absorber recited in claim 1 wherein said convex anvil means comprises:

an annular collar on an end of said mast jacket having an integral convex surface overlapping a wall of said mast jacket and defining said convex anvil means such that when said concave web of said J-shaped flat metal strap bears against said convex anvil means, said first leg is outside of said mast jacket and said second leg is inside of said mast jacket.

3. The energy absorber recited in claim 1 wherein said convex anvil means comprises:

a collar on an end of said mast jacket having a convex surface radially outboard of said mast jacket defining said convex anvil means such that when said concave web of said J-shaped flat metal strap bears against said convex anvil means, each of said first leg and said second leg is outside of said mast jacket.

4. The energy absorber recited in claim 1 further comprising:

a second convex anvil means on said mast jacket diametrically opposite said first convex anvil means in a plane defined by said longitudinal centerline and said lateral centerline intersecting therewith, a second J-shaped flat metal strap having a concave web bearing against the second convex anvil means and a first leg rigidly attached to said yoke and a second leg juxtaposed a wall of said mast jacket parallel to said longitudinal centerline of said mast jacket, linear translation of said mast jacket relative to said yoke in the direction of said longitudinal centerline of said mast jacket in response to an impact on said steering column being operative to effect relative sliding of said second flat metal strap across said second convex anvil means to plastically deform said second metal strap and convert into work a fraction of the kinetic energy of said impact on said steering column, and a second guide means operative to maintain substantial parallelism between said second leg of said second metal strap and said longitudinal centerline of said mast jacket during linear translation of said mast jacket relative to said yoke.

* * * * *